United States Patent [19]

Goloff

[11] 4,037,998

[45] July 26, 1977

[54] ROTARY ENGINE COOLING

[75] Inventor: Alexander Goloff, East Peoria, Ill.

[73] Assignee: Caterpillar Tractor Co., Peoria, Ill.

[21] Appl. No.: 628,020

[22] Filed: Nov. 3, 1975

[51] Int. Cl.² .................. F01C 21/06; F01P 3/02; F02F 1/14

[52] U.S. Cl. .................. 418/83; 418/178; 418/179; 92/144; 123/41.79

[58] Field of Search .................. 418/83-90, 418/178, 179; 123/8.01, 41.71, 41.79, 41.8; 92/144

[56] References Cited

U.S. PATENT DOCUMENTS

| | | | |
|---|---|---|---|
| 2,277,113 | 3/1942 | Kimmel | 92/144 |
| 3,096,720 | 7/1963 | Younger | 418/170 |
| 3,102,516 | 9/1963 | Gist et al. | 418/83 |
| 3,155,313 | 11/1964 | Bentele | 418/178 |
| 3,196,851 | 7/1965 | Jungbluth | 418/83 |
| 3,239,135 | 3/1966 | Fritz | 418/83 |
| 3,313,276 | 4/1967 | Ito et al. | 418/83 |
| 3,484,823 | 12/1969 | Weatherston | 418/83 |
| 3,836,293 | 9/1974 | Lamm | 418/83 |
| 3,920,360 | 11/1975 | Bierlein | 418/178 |

FOREIGN PATENT DOCUMENTS

| | | | |
|---|---|---|---|
| 580,767 | 8/1959 | Canada | 418/83 |
| 136,470 | 11/1929 | Switzerland | 418/83 |

Primary Examiner—John J. Vrablik
Attorney, Agent, or Firm—Wegner, Stellman, McCord, Wiles & Wood

[57] ABSTRACT

An improved rotary engine including a housing having interior walls defining an operating chamber with a rotor mounted for movement therein. Within the chamber is a thin layer of wear resistant metal which is located to be sealingly engaged by the rotor as the rotor moves within the chamber and a backing is secured to the thin layer in good heat transfer relation and interposed between the same and the housing for transmitting pressure applied to the thin layer to the housing. The backing is formed of a metal having high thermal conductivity and is provided with a plurality of relatively closely spaced coolant passages to provide an improved cooling structure for the engine to thereby extend its life.

9 Claims, 4 Drawing Figures

U.S. Patent     July 26, 1977     4,037,998
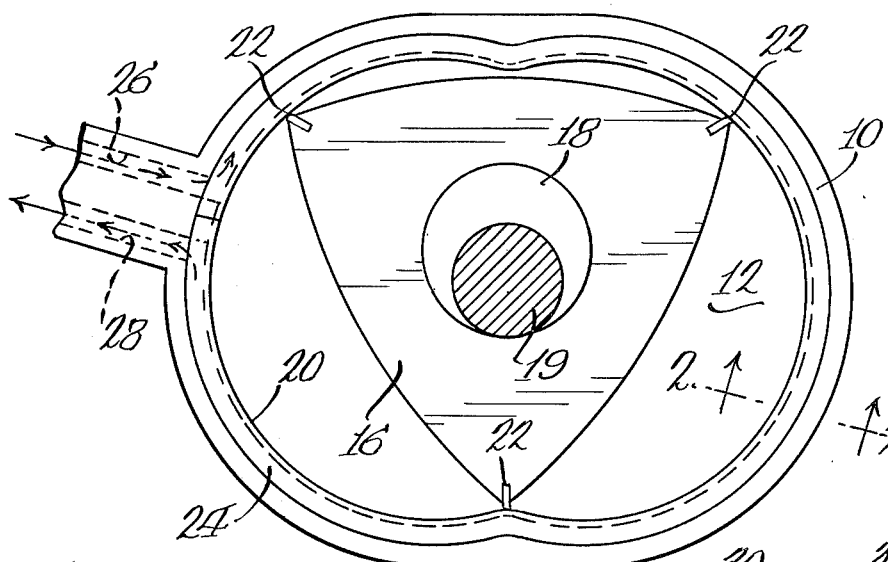
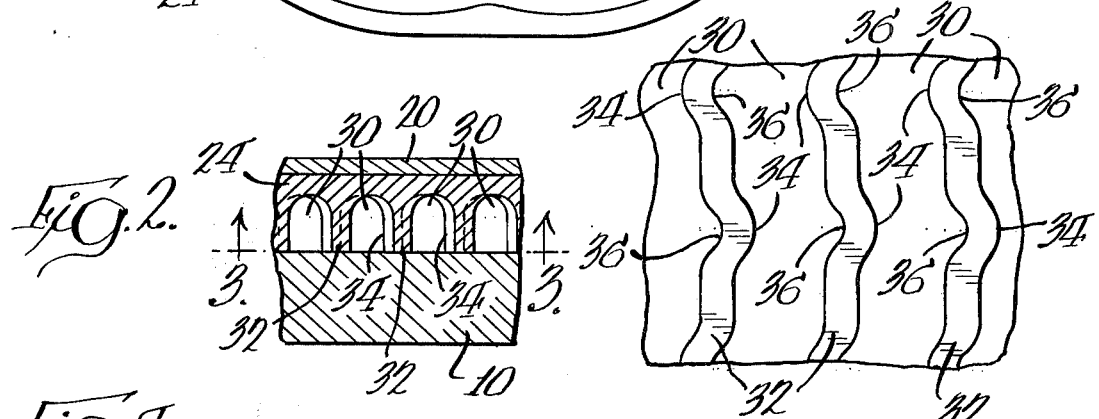
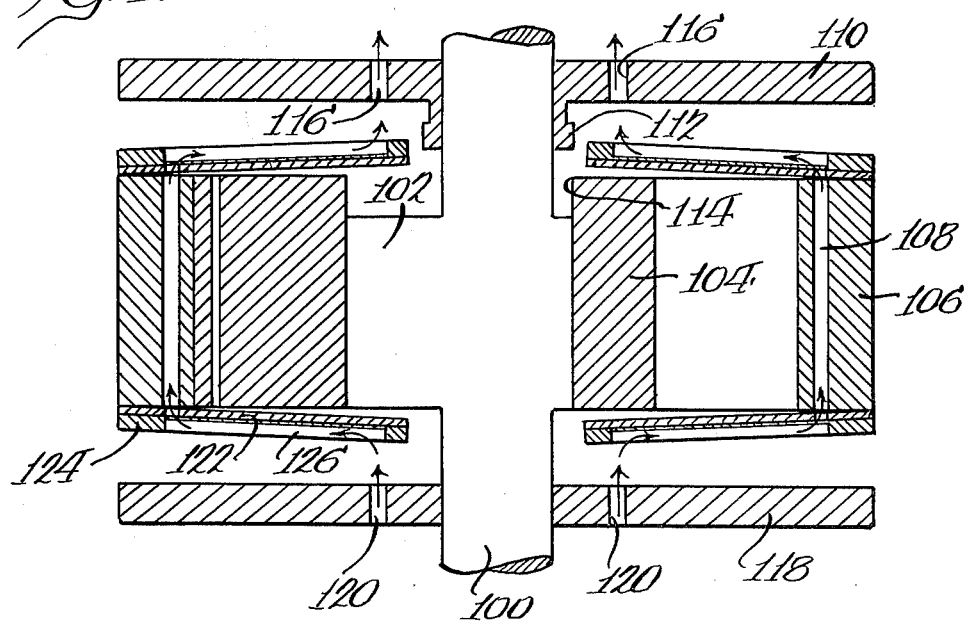

ROTARY ENGINE COOLING

BACKGROUND OF THE INVENTION

This invention relates to rotary engines, and, more particularly, to improved means for cooling rotary engines to maintain oil film thickness, thereby reducing wear and extending the useful life of such an engine.

Prior art of possible relevance include the following U.S. Pat. Nos. 3,239,135, issued to Fritz on Mar. 8, 1966; 3,359,615, issued to Bauer Dec. 26, 1967; 3,359,953, issued to Groth on Dec. 26, 1967; and 3,693,608, issued to Neishi on Sept. 26, 1972.

So-called "center housings" of rotary engines have been notoriously difficult to cool due to the fact that heat is generated at localized areas close to the combustion zone without the benefit of at least periodic exposure to a fresh charge of air or a mixture of fuel and air which provides periodic cooling, as is well known in reciprocating engines. Consequently, there is a serious tendency for scuffing, rapid wear and leakage to occur in such areas.

In a like manner, side walls in trochoidal type engines and the spherical outer wall of slant axis rotary engines have a tendency to scuff badly even though such surfaces are rubbed against by seals even with low contact stresses. This is due to the fact that side seals on trochoidal type engines and peripheral seals on slant axis rotary engines move against the surface to be sealed with a large longitudinal component relative to their length in a manner not totally unlike an ice skate on ice. As a consequence, while adequate lubrication may be present at the leading edge of such seals, the leading edge will tend to heat up the surface to be sealed by reason of friction thereby thinning the oil film so that frequently the trailing edge of such a seal is not adequately lubricated and serious scuffing results.

Attempts have been made to overcome these difficulties through structures with improved cooling or replaceable operating chamber liners which may be removed and discarded once badly worn; and the previously identified patents are illustrative of such approaches. While such approaches represent an improvement, they have not proved to be altogether satisfactory.

SUMMARY OF THE INVENTION

It is the principal object of the invention to provide a new and improved rotary engine. More specifically, it is an object of the invention to provide such an engine with improved means for cooling the same so as to be able to maintain adequate oil film thickness, thereby minimizing wear and scuffing.

The exemplary embodiment of the invention achieves the foregoing object in a rotary engine having a housing with interior walls defining an operating chamber. A rotor is mounted for movement in the chamber and a thin layer of wear resistant metal is located within the chamber to be sealingly engaged by the rotor as the rotor moves within the chamber. A backing for the thin layer is interposed in sandwiched relation between the thin layer and the housing for transmitting pressure applied to the thin layer to the housing. The backing is formed of a metal having high thermal conductivity and is provided with a plurality of relatively closely spaced coolant passages.

According to a highly preferred embodiment of the invention, the thin layer is bonded, in good heat transfer relation, to the backing.

Preferably, the coolant passages are elongated and the backing includes a plurality of protrusions extending into the passages to introduce turbulence in a coolant passing through the passages to enhance heat transfer and thereby cooling. In such a case, it is preferable that the passages have a uniform cross sectional area along their length for uniform velocity of the coolant.

According to one embodiment of the invention, the housing has opposed side walls and a radially outer peripheral wall. The thin layer and the backing extend at least partially about the peripheral wall in the areas adjacent to and including the combustion zone.

In a highly preferred embodiment, the thin layer and the backing extend entirely about the peripheral wall with the passages being elongated about the peripheral wall.

According to a preferred embodiment of the invention, the passages open along their length to one side of the backing and are closed by either the thin layer or the housing.

In a highly preferred embodiment of the invention, the thin layer and the backing are configured to define replaceable liners for the engine and, when employed as side wall liners in a trochoidal type engine, are pre-bowed such that the surface of the thin layer opposite from the backing is slightly concave so that upon assembly, a good tight fit will be maintained to eliminate chattering between the liner and the housing.

Other objects and advantages will become apparent from the following specification taken in conjunction with the accompanying drawings.

DESCRIPTION OF THE DRAWINGS

FIG. 1 is a somewhat schematic illustration of a rotary engine embodying the invention;

FIG. 2 is a sectional view taken approximately along the line 2—2 of FIG. 1;

FIG. 3 is a fragmentary, enlarged, sectional view taken approximately along the line 3—3 of FIG. 2; and FIG. 4 is an exploded view of a modified embodiment of an engine made according to the invention.

DESCRIPTION OF THE PREFERRED EMBODIMENTS

An exemplary embodiment of the invention is illustrated in connection with a trocohidal type of rotary engine as illustrated in FIG. 1. The engine includes a center housing 10 which may be flanked by a pair of end housings 12 (only one of which is shown) to define an operating chamber. Typically, the housings 10 and 12 will be formed of cast iron or the like or, in some instances, where light weight is of concern, possibly of aluminum of magnesium alloys.

Within the chamber defined by the housings 10 and 12 there is located a rotor 16 which is journalled on the eccentric portion 18 of a shaft 19.

Facing the rotor and located on the interior peripheral wall of the center housing 10, is a thin layer 20 of wear resistant material which is adapted to be sealingly engaged by the seals typically carried by the rotor 16. As illustrated in FIG. 1, the thin layer 20 is engaged by so-called apex seals 22 on the rotor.

Backing the thin layer and interposed in sandwiched relation between the thin layer 20 and the center housing 10, is a backing member 24. The backing member 24 transmits pressure applied to the thin layer during operation of the engine to the housing.

As will be seen hereinafter, the backing 24 includes a plurality of coolant passages for cooling the thin layer 20. To this end, an appropriate coolant inlet port 26 is provided along with a coolant outlet port 28. Typically, the thin layer 20 of wear resistant material will be defined by a thin sheet of steel which may be optionally hard surfaced with chrome or other suitable wear resistant materials.

THe backing 24 is formed of a metal having a high thermal conductivity, such as copper, brass, aluminum, magnesium, or the like. As a secondary consideration, it is preferred that the backing material be relatively ductile.

As seen in FIG. 2, the backing 24 is provided with a plurality of coolant passages 30 which are spaced as close together as possible consistent with the strength required to preclude the backing 24 from collapsing during engine operation. According to one embodiment, the passages 30 extend circumferentially around the center housing 10 as illustrated in FIG. 1. However, other flow patterns can be employed as desired.

Preferably, the thin layer 20 is bonded to the backing 24 in good heat conducting relation. For example, suitable bonding may be achieved by silver soldering or the like. Where the two materials employed in forming the thin layer 20 and the backing 24 do not readily unite, adhesive may be employed to bond the two together. In general, the arrangement will be such that the distance from the surface of the thin layer 20 sealingly engaged by the seals carried by the rotor 16 and exposed to combustion gases to the coolant passages 30 will be on the order of 0.1 to 0.2 inches, depending upon strength requirements.

As illustrated, the individual passages 30 are defined by separating fins 32 which may be formed by coining or the like. In such a case, the passages 30 have an open side along their length, which opening is closed by the center housing 10 to effectively seal the same. While not shown herein, those skilled in the art will recognized that, if desired, the backing member 24 could be rotated 180° from the position shown, such that the open sides of the passages 30 would be adjacent the thin layer 20.

As illustrated in FIGS. 2 and 3, the backing member 24 includes a series of projections 34 extending into each of the passages 30. When coolant is flowing through the passages 30, such projections or protrusions induce turbulence into the flow of the coolant to enhance heat transfer and, more specifically, to avoid the film boiling mode of heat transfer. The turbulence induced by the protrustions or projections 34 sweep away vapor bubbles as they are formed to thereby assure the nucleate boiling mode of heat transfer. As a consequence, desirable heat transfer is attained with relatively low velocity of the coolant, thereby reducing the load placed on the coolant pump.

To insure substantially uniform velocity of the coolant through the passages 30, the same are made with a uniform cross sectional area throughout their length. Thus, opposite each of the protrusions 34 is a recess 36.

From the foregoing, it will be appreciated that by reason of the use of a metal having a high thermal conductivity for the backing 24, and the close proximity of the coolant passages to the heated surface, excellent cooling of the hotter areas of an engine can be obtained. For example, by employing steel clad copper as the assemblage defined by the thin layer 20 and the backing 24, and having a 0.12 inch separation between the sealing surface and the passages, a substantial temperature reduction can be achieved.

If desired, the composite of the thin layer 20 and the backing 24 may be employed only at the combustion zone and immediately adjacent areas. Alternately, it may be employed throughout all surfaces. In such a case, very uniform temperatures throughout the engine will be achieved, thereby reducing distortion to eliminate leakage and rapid wear of the apex seals.

FIG. 4 illustrates a modified embodiment of the invention as applied to the side walls of an operating chamber of a trochoidal engine. The engine of FIG. 4 includes a shaft 100 having an eccentric 102 journalling a rotor 104. A center housing 106 surrounds the rotor 104 and is illustrated as having conventional coolant passages 108 therein. However, it is to be understood that cooling of the center housing 106 could be achieved through use of the invention illustrated in the embodiment of FIGS. 1–3 merely by arranging the passages 30 to extend transversely across the housing 106 rather than circumferentially.

An end housing 110 is provided and includes a gear 112 integral therewith for meshing with an internal ring gear surface 114 on the rotor 104, as is well known. The end housing 110 may be formed of cast iron or any of the other materials mentioned in connection with the fabrication of the housings 10 and 12.

Coolant outlet ports 116 are located in the end housing 110.

A similar end housing 118 having coolant inlet ports 120 is also provided. Suitable means are provided for journalling the shaft 100.

The sealing surfaces adjacent the sides of the rotor 104 are defined by composite structures having a thin wear resistant layer 122 and a backing 124 formed of a metal having a high thermal conductivity. Coolant passages 126 are located in the backing 124 and may extend radially, spirally, or the like. The same are generally formed along the lines mentioned in connection with the description of the embodiment of FIGS. 1–3, but are adapted to extend radially outwardly of the interior of the operating chamber so as to abut the sides of the center housing 106. As a result, the composite structure defines a replaceable liner for the engine that may be replaced when worn. Preferably, each liner is formed with a slight pre-bow as illustrated in FIG. 4. That is, each is formed so that the sealing surface of the thin layer 122 is slightly concave. Thus, when the end housings 110 and 118 are secured to the center housing 106, the same will conform generally to the interior surface of the end housing by reason of the inherent resiliency of the liner thereby eliminating chattering between the liner and the end housing during engine operation.

It will, accordingly, be appreciated that an embodiment of the invention made in accordance with FIG. 4 will provide adequate cooling sufficient to maintain a desired oil film thickness adjacent side seals in a trochoidal type engine so that, even though the same move in the aforementioned skating motion, adequate lubrication is maintained. It will also be recognized that the principles of the invention may be advantageously employed in other rotary engines such as a slant axis rotary engine.

What is claimed is:

1. A rotary engine comprising:
   a. a housing having interior walls defining an operating chamber;

b. a rotor mounted for movement in said chamber;

c. a thin layer of wear resistant metal within said chamber and located to be sealingly engaged by said rotor as said rotor moves within said chamber; and d. a backing for said thin layer interposed in sandwiched relation between said thin layer and said housing for transmitting pressure applied to said thin layer to said housing, said backing being formed of a metal having high thermal conductivity and being provided with a plurality of relatively closely spaced, elongated, coolant passages, said backing including a plurality of protrusions extending into said passages to introduce turbulence in a coolant passing through said passages, said passages having a substantially uniform cross sectional area along their length.

2. The rotary engine of claim 1 wherein said passages are open along their length to one side of said backing, one of said thin layer and said housing abutting said backing to substantially close said one side of said passages.

3. A rotary engine according to claim 1 wherein said metal having a high thermal conductivity is selected from the group consisting of copper, brass, aluminum and magnesium.

4. The rotary engine of claim 1 wherein said thin layer is bonded to said backing in good heat transfer relation.

5. The rotary engine of claim 4 wherein said housing has opposed side walls and a radially outer peripheral wall; and said thin layer and said backing extend at least partially about said peripheral wall.

6. The rotary engine of claim 5 wherein said thin layer and said backing extend entirely about said peripheral wall; and said passages are elongated about said peripheral wall.

7. The rotary engine of claim 4 wherein said housing has opposed side walls and a radially outer peripheral wall; and said thin layer and said backing are located on said side walls.

8. The rotary engine of claim 7 wherein said side walls are separate from said peripheral wall and said thin layer and said backing are formed to define a removable liner for said operating chamber.

9. The rotary engine of claim 8 wherein said rotor has generally planar side surfaces facing said side walls and said removable liner defined by said thin layer and said backing is pre-bowed such that said thin layer opposite from said backing is slightly concave prior to assembly.

* * * * *